(12) United States Patent
You et al.

(10) Patent No.: US 12,517,373 B2
(45) Date of Patent: Jan. 6, 2026

(54) ATTACHED FLOATING IMAGE TOUCH-CONTROL DEVICE

(71) Applicant: Darwin Precisions Corporation, Hsinchu County (TW)

(72) Inventors: Ran-Shiou You, Hsinchu County (TW); Ya Han Ko, Hsinchu County (TW); Yu Jen Lai, Hsinchu County (TW); Hsing-Yu Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 228 days.

(21) Appl. No.: 18/236,200

(22) Filed: Aug. 21, 2023

(65) Prior Publication Data

US 2024/0103292 A1 Mar. 28, 2024

(30) Foreign Application Priority Data

Sep. 22, 2022 (TW) .................................. 111135983

(51) Int. Cl.
*G02B 30/56* (2020.01)
*G06F 3/048* (2013.01)
*G06F 3/04883* (2022.01)

(52) U.S. Cl.
CPC ......... *G02B 30/56* (2020.01); *G06F 3/04883* (2013.01)

(58) Field of Classification Search
CPC ... G02B 30/56; G06F 3/04883; G06F 3/0202; H01H 2219/066; H01H 2239/006; H01H 2239/068; H01H 13/83; H03K 17/945
See application file for complete search history.

(56) References Cited

U.S. PATENT DOCUMENTS

| | | | | |
|---|---|---|---|---|
| 8,416,268 | B2* | 4/2013 | Tomisawa | H04N 13/393 |
| | | | | 345/679 |
| 10,606,398 | B2* | 3/2020 | Kim | G06F 3/017 |
| 11,620,022 | B1* | 4/2023 | Huang | G02B 30/10 |
| | | | | 345/175 |
| 11,886,221 | B2* | 1/2024 | Edo | G06F 3/012 |
| 2022/0335745 | A1 | 10/2022 | Lai | |
| 2023/0115995 | A1 | 4/2023 | Hsu | |

FOREIGN PATENT DOCUMENTS

| | | |
|---|---|---|
| CN | 202177686 U | 3/2012 |
| CN | 113064494 A | 7/2021 |
| TW | I770949 B | 7/2022 |
| TW | I777808 B | 9/2022 |

* cited by examiner

Primary Examiner — Vijay Shankar
(74) Attorney, Agent, or Firm — WPAT, PC

(57) ABSTRACT

An attached floating image touch-control device is provided. The attached floating image touch-control device includes a trigger module, a floating image generation module and a sensing module. The trigger module includes a movable trigger component. The floating image generation module includes a light source, an imaging unit, and a floating imaging unit disposed on the imaging unit. The sensing module is arranged on the floating image generation module and communicatively connected to the trigger module, wherein when the sensing module senses a touch action, the sensing module outputs a driving signal, and the trigger module moves the trigger component based on the driving signal to contact and trigger the contact-type button.

10 Claims, 9 Drawing Sheets

ATTACHED FLOATING IMAGE TOUCH-CONTROL DEVICE

CROSS-REFERENCE TO RELATED APPLICATION

This application claims the priority benefit of Taiwan application serial no. 111135983 filed on Sep. 22, 2022. The entirety of the above-mentioned patent applications is hereby incorporated by reference herein and made a part of this specification.

TECHNICAL FIELD

The present disclosure relates to an attached floating image touch-control device.

BACKGROUND

A conventional button is mostly a physical mechanical button or an inductively triggered button such as a capacitive touch button or an infrared sensor button, and has the switching function only when needing physical touch. In other words, it is difficult for a user to avoid touching a button or a panel during operation. In order to prevent bacteria and viruses from diffusion in this way, a touch panel with a floating touch function emerges.

In an embodiment shown in FIG. 1, a floating image touch module 80 generally includes a floating image generation module 20 and a sensing module 30. The floating image generation module 20 is configured to generate a floating image 70, and includes a light source 21, an imaging unit 22, and a floating image generation unit 23. The sensing module 30 is configured to sense a touch action within a viewing range 71 and transmit a touch signal. In other words, the floating image generation module occupies a considerable space. However, in an embodiment shown in FIG. 2, for a contact-type touch device 90 such as an elevator operation panel, an internal space 92 of the contact-type touch device can usually only accommodate a contact-type button 91 and a circuit of the contact-type touch device. If the contact-type touch device is to be modified into a non-contact touch device, not only the mechanism needs to be redesigned and modified, but also the space is insufficient.

SUMMARY

An object of the present disclosure is to provide an attached floating image touch-control device, configured for use with a contact-type touch device, wherein the contact-type touch device comprises a contact-type button, which is capable of making a contact-type touch device has non-contact touch-control function more economically and conveniently.

An attached floating image touch-control device of the present disclosure comprises a trigger module, a floating image generation module, and a sensing module. The trigger module includes a movable trigger component. The floating image generation module includes a light source, an imaging unit arranged on the light source, and a floating image generation unit arranged on the imaging unit. The sensing module is arranged on the floating image generation module and communicatively connected to the trigger module, wherein when the sensing module senses a touch action, the sensing module outputs a driving signal, and the trigger module moves the trigger component based on the driving signal to contact and trigger the contact-type button.

In this embodiment of the present disclosure, the attached floating image touch-control device further includes a fixed device, wherein the trigger module, the floating image generation module, and the sensing module are arranged in the fixed device, and the fixed device is fixed to a side of the contact-type button, so that the trigger module is located in front of the contact-type button.

In this embodiment of the present disclosure, the fixed device includes a panel and a fixed member. The panel includes a module arrangement hole and a first side surface and a second side surface opposite to each other, wherein the trigger module, the floating image generation module, and the sensing module are arranged in the module arrangement hole, the sensing module is configured to sense the touch action performed on an outer side of the first side surface, the floating image generation module is configured to generate a floating image to be displayed on the outer side of the first side surface, and the trigger component of the trigger module is movable on an outer side of the second side surface. The fixed member is arranged on the second side surface and surrounding a periphery of the panel, wherein the fixed member is configured to be fixed to the front of the contact-type button, so that a vertical projection of the contact-type button with respect to the panel overlaps the module arrangement hole.

In this embodiment of the present disclosure, the attached floating image touch-control device further includes an auxiliary fixed member, wherein the auxiliary fixed member is configured to be fixed beside the contact-type button, and the fixed member is fixed to the auxiliary fixed member.

In this embodiment of the present disclosure, wherein the fixed device is light-transmissive.

In this embodiment of the present disclosure, wherein vertical projections of the trigger module and the floating image generation module with respect to a plane substantially overlap.

In this embodiment of the present disclosure, wherein vertical projections of the trigger module and the floating image generation module with respect to a plane do not overlap.

In this embodiment of the present disclosure, the attached floating image touch-control device further includes a status indication module communicatively connected to the sensing module, wherein the status indication module generates a status indication signal based on the driving signal.

In this embodiment of the present disclosure, wherein the status indication module is a light-emitting device, and the status indication signal is light.

In this embodiment of the present disclosure, wherein the status indication module is a sound generation device, and the status indication signal is a sound.

DETAILED DESCRIPTION

Figure 1:
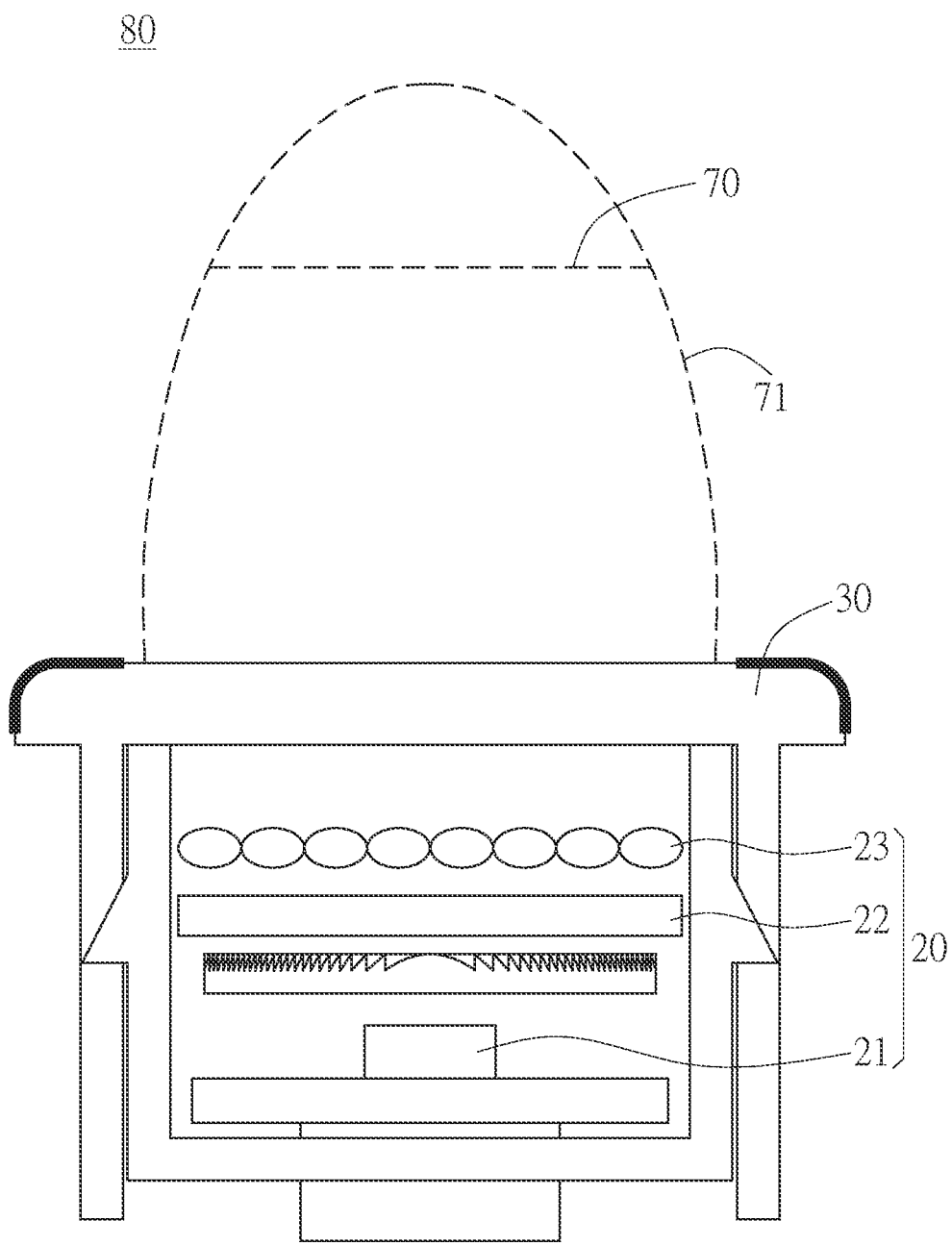
FIG. 1 is a schematic diagram showing implementation of a conventional floating image touch module.
Figure 2:
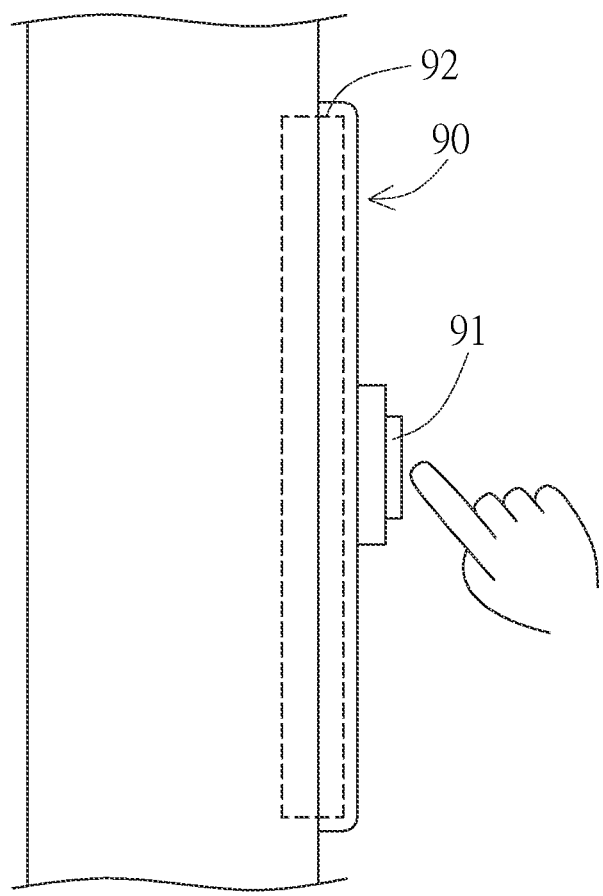
FIG. 2 is a schematic diagram of an embodiment of a conventional contact-type touch device.

Implementations of a connection assembly disclosed by the present disclosure are described below by using particular and specific embodiments with reference to the drawings, and a person skilled in the art may learn of advantages and effects of the present disclosure from the disclosure of this specification. However, the following disclosure is not intended to limit the protection scope of the present disclosure, and a person skilled in the art may carry out the present disclosure by using other different embodiments based on different viewpoints without departing from the concept and spirit of the present disclosure. In the accompanying drawings, plate thicknesses of layers, films, panels, regions, and the like are enlarged for clarity. Throughout the specification, same reference numerals indicate same elements. It should be understood that when an element such as a layer, film, region or substrate is referred to as being "on" or "connected" to another element, it may be directly on or connected to the another element, or intervening elements may also be present. In contrast, when an element is referred to as being "directly on" or "directly connected to" another element, there is no intervening element present. As used herein, "connection" may refer to a physical and/or electrical connection. Further, "electrical connecting" or "coupling" may indicate that another element exists between two elements.

It should be noted that the terms "first", "second", "third", and the like that are used in the present disclosure can be used for describing various elements, components, regions, layers and/or portions, but the elements, components, regions, layers and/or portions are not limited by the terms. The terms are merely used to distinguish one element, component, region, layer, or portion from another element, component, region, layer, or portion. Therefore, the "first element", "component", "region", "layer", or "portion" discussed below may be referred to as a second element, component, region, layer, or portion without departing from the teaching of this disclosure.

In addition, relative terms, such as "down" or "bottom" and "up" or "top", are used to describe a relationship between an element and another element, as shown in the figures. It should be understood that the relative terms are intended to include different orientations of a device in addition to orientations shown in the figures. For example, if a device in a figure is turned over, an element that is described to be on a "lower" side of another element is directed to be on an "upper" side another element. Therefore, the exemplary terms "down" may include orientations of "down" and "up" and depends on a particular orientation of an accompanying drawing. Similarly, if a device in a figure is turned over, an element that is described as an element "below" another element or an element "below" is directed to be "above" another element. Therefore, the exemplary terms "below" or "below" may include orientations of up and down.

As used herein, "about", "approximately", or "substantially" is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, ±20%, ±10%, ±5% of the stated value. Further, as used herein, "about", "approximately", or "substantially" may depend on optical properties, etch properties, or other properties to select a more acceptable range of deviations or standard deviations without one standard deviation for all properties.

Figure 3A:
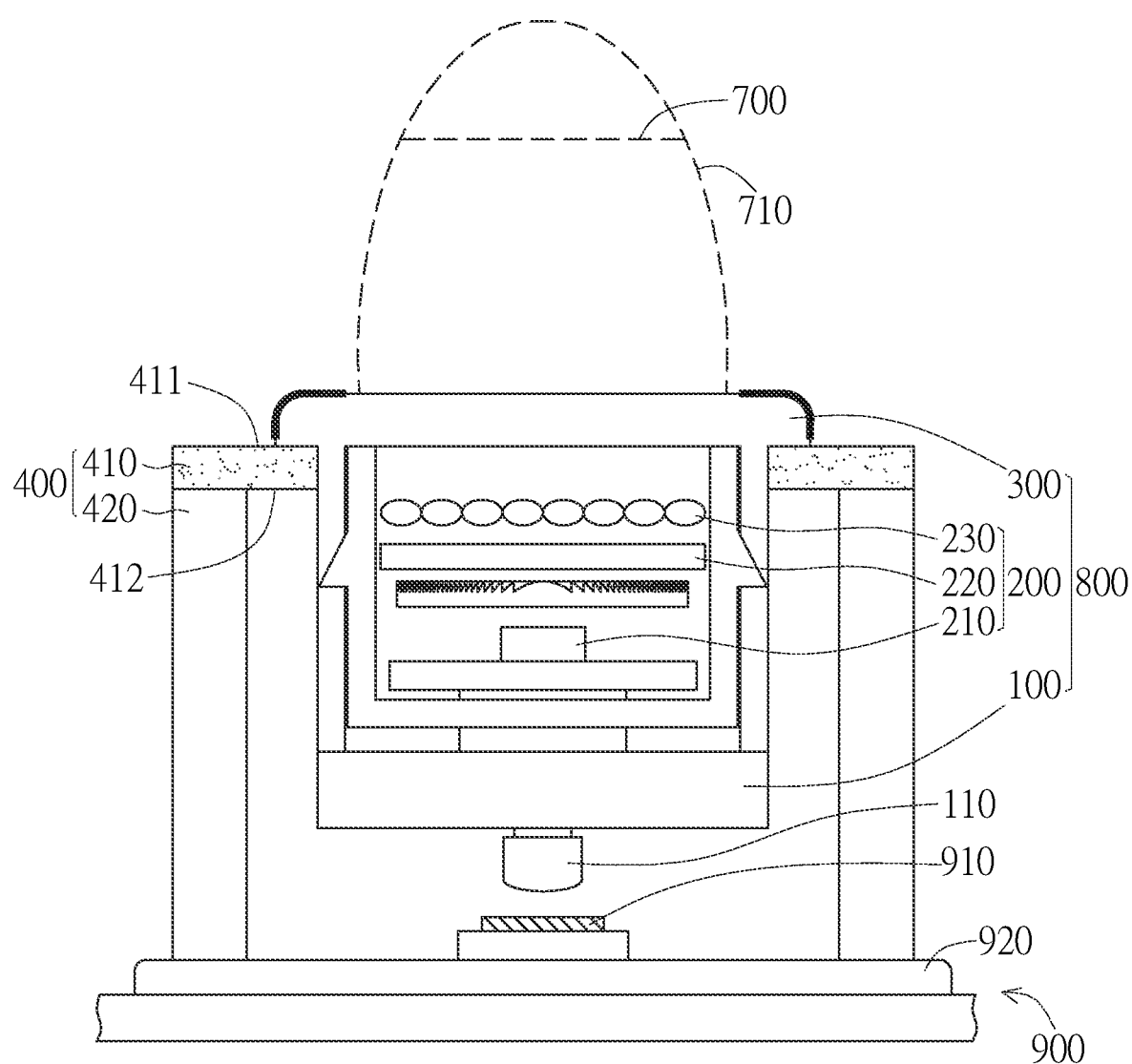
FIG. 3A and FIG. 3B are schematic diagrams of an embodiment of an attached floating image touch-control device according to the present disclosure.

In the embodiment shown in FIG. 3A, an attached floating image touch-control device 800 of the present disclosure is provided to be used in cooperation with a contact-type touch device 900 such as an elevator operation panel. The contact-type touch device 900 includes a contact-type button 910. The contact-type button 910 can only be triggered by physical touch, including a physical mechanical button or an inductively triggered button such as a capacitive touch button or an infrared sensor button. The so-called "attached" generally means a form that the original mechanism (especially the contact-type button 910) inside the contact-type touch device 900 is not changed, but is additionally arranged from outside.

In the embodiment shown in FIG. 3A, the attached floating image touch-control device 800 includes a trigger module 100, a floating image generation module 200, and a sensing module 300. The trigger module 100 includes a movable trigger component 110. The trigger component 110 is movable to contact and trigger the contact-type button 910, and the mechanism and a material of the trigger component may be adjusted based on the form of the contact-type button 910. For example, for the physical mechanical button, the trigger component 110 may be a rod with good mechanical strength and no electrical conductivity, such as plastic or alloy. For example, for the capacitive touch button, the trigger component 110 may be composed of a conductive metal rod and a conductive polymer terminal.

In the embodiment shown in FIG. 3A, the floating image generation module 200 includes a light source 210, an imaging unit 220 arranged on the light source 210, and a floating image generation unit 230 arranged on the imaging unit 220. Further, the floating image generation module 200 may display a floating image 700 on a side away from the trigger module 100. The light source 210 may be a point light source such as a light-emitting diode or a diffused and homogenized surface light source. The imaging unit 220 is provided with a pattern of a floating image to be formed. Further, the pattern on the imaging unit 220 can block the light ray. In different embodiments, the imaging unit 220 may be a negative with a fixed pattern, a mask, a liquid crystal layer with a variable pattern, or the like. The floating image generation unit 230 is arranged parallelly on a side of the imaging unit 220 away from the light source 210. In an embodiment, the floating image generation unit is a micro-lens array, which may include a single-sided or double-sided convex lens structure, and may be made by processes such as ultraviolet imprinting, ejection, and hot pressing.

In an embodiment shown in FIG. 3A, the sensing module 300 is arranged on the floating image generation module 200 and is communicatively connected to the trigger module 100. The communication connection generally means a connection of signal transmission achieved in a wired (such as wires) or wireless manner (such as radio, Wi-Fi, or Bluetooth). More specifically, in order to touch and trigger the contact-type button 910, the trigger module 100 needs to be arranged in front of or at least adjacent to the contact-type button. In an embodiment shown in FIG. 3A, the sensing module 300, the floating image generation module 200, and the trigger module 100 are arranged to overlap. In other words, in this embodiment, vertical projections of the trigger module 100 and the floating image generation module 200 with respect to a plane (not shown) substantially overlap. However, in different embodiments, the sensing module and the floating image generation module may be arranged at positions away from the contact-type button 910 based on considerations such as convenience of operation, aesthetics, or space limitation. In other words, in different embodiments, vertical projections of the trigger module 100 and the floating image generation module 200 with respect to a plane (not shown) do not overlap. Correspondingly, the connection between the sensing module 300 and the trigger module 100 may be wired or wireless, so as to achieve communication connection and ensure signal transmission.

Figure 3B:
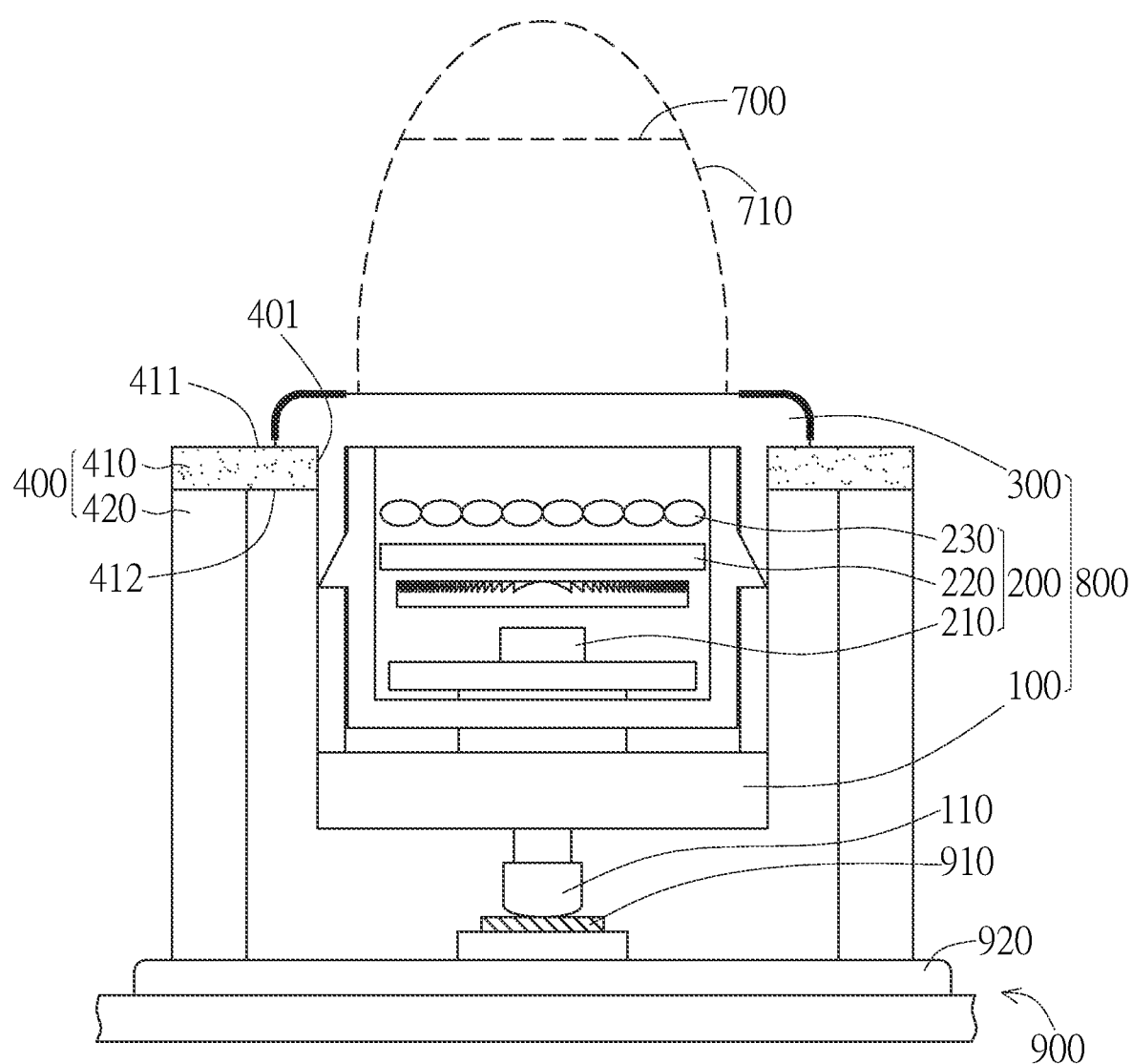

In the embodiment shown in FIG. 3B, when the sensing module 300 senses a touch action in a sensing region (for example, a viewing range 710), the sensing module 300 outputs a driving signal, and the trigger module 100 moves the trigger component 110 based on the driving signal to contact and trigger the contact-type button 910. Accordingly, the contact-type button 910 can be triggered in a non-contact manner Since the attached floating image touch-control device 800 of the present disclosure does not change the original mechanism inside the contact-type touch device 900, but is additionally arranged from the outside, the contact-type touch device 900 can have a non-contact touch function more economically and conveniently.

Based on the considerations such as manufacture, use, or design, the attached floating image touch-control device 800 of the present disclosure is additionally arranged on the contact-type touch device 900 in a plurality of manners, that is, relative positions of the attached floating image touch-control device and the contact-type touch device are fixed. Further, in the embodiment shown in FIG. 3B, the attached floating image touch-control device 800 further includes a fixed device 400, a trigger module 100, a floating image generation module 200, and a sensing module 300 arranged in the fixed device 400. The fixed device 400 may be fixed on a side of the contact-type button 910, so that the trigger module 100 is located in front of the contact-type button 910.

Figure 4A:
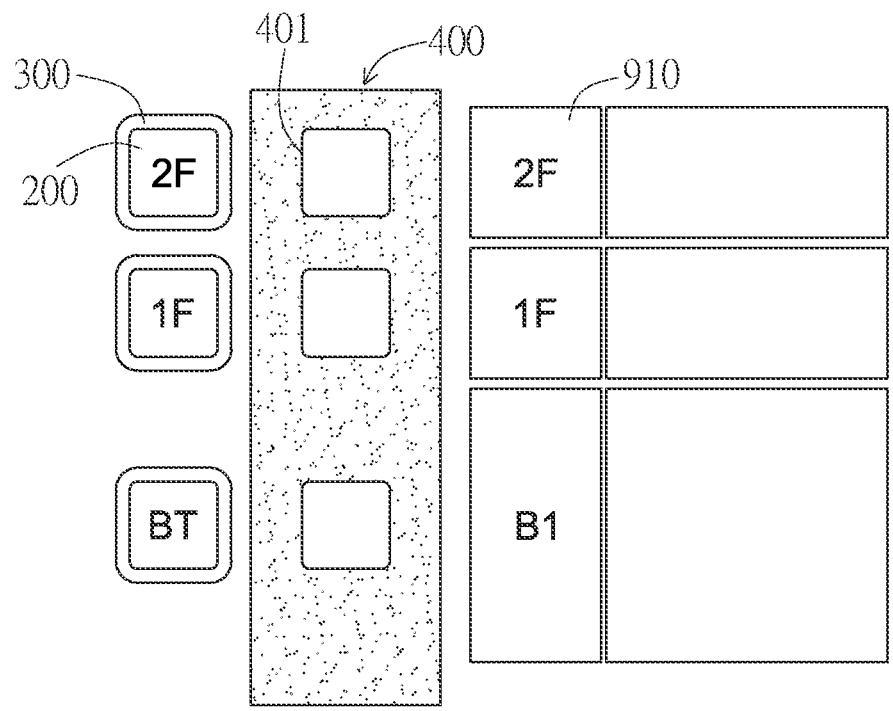
FIG. 4A to FIG. 4B are schematic diagrams of an embodiment of a fixed device according to the present disclosure.
Figure 4B:
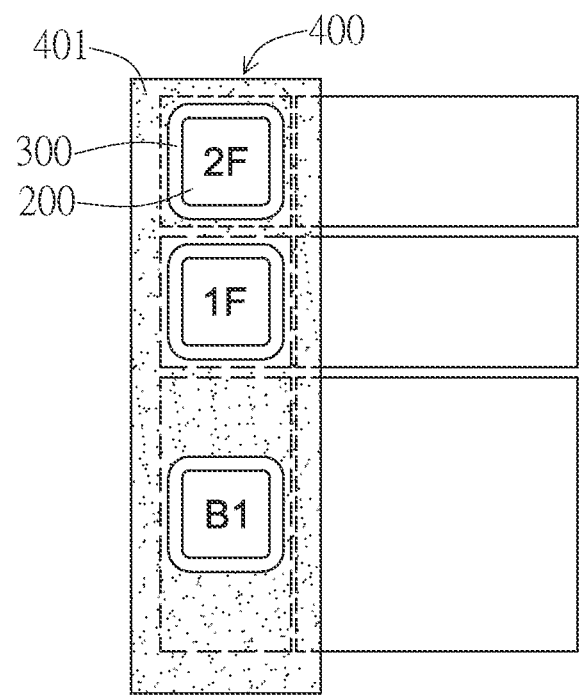

More specifically, in the embodiment shown in FIG. 3B, the fixed device 400 includes a panel 410 and a fixed member 420. The panel 410 includes a module arrangement hole 401 and a first side surface 411 and a second side surface 412 opposite to each other. The trigger module 100, the floating image generation module 200, and the sensing module 300 are arranged in the module arrangement hole 401. The sensing module 300 is configured to sense a touch action performed on an outer side of the first side surface 411, the floating image generation module 200 is configured to generate the floating image 700 to be displayed on the outer side of the first side surface 411, and the trigger component 110 of the trigger module 100 may move on the outer side of the second side surface 412 to be close to or away from the contact-type button 910. The fixed member 420 is arranged on the second side surface 412 and surrounds a periphery of the panel 410, and is configured to be fixed to the front of the contact-type button 910, so that a vertical projection of the contact-type button 910 with respect to the panel 410 overlaps the module arrangement hole 401. Viewed from different angles, in the embodiments shown in FIG. 4A and FIG. 4B, when the fixed device 400 is fixed to the front of the contact-type button 910, the module arrangement hole 401 is preferably located right in front of the contact-type button 910, so that the attached floating image touch-control device including the floating image generation module 200 and the sensing module 300 is located right in front of the contact-type button 910 to be triggered. However, in different embodiments, the fixed member 420 is not limited to surrounding the periphery of the panel 410, and may be arranged at one or more side edges, or in the shaped of a point. For example, the fixed member 420 may be a fixed rod with one end being connected to the panel 410 by sticking or locking.

Figure 5:
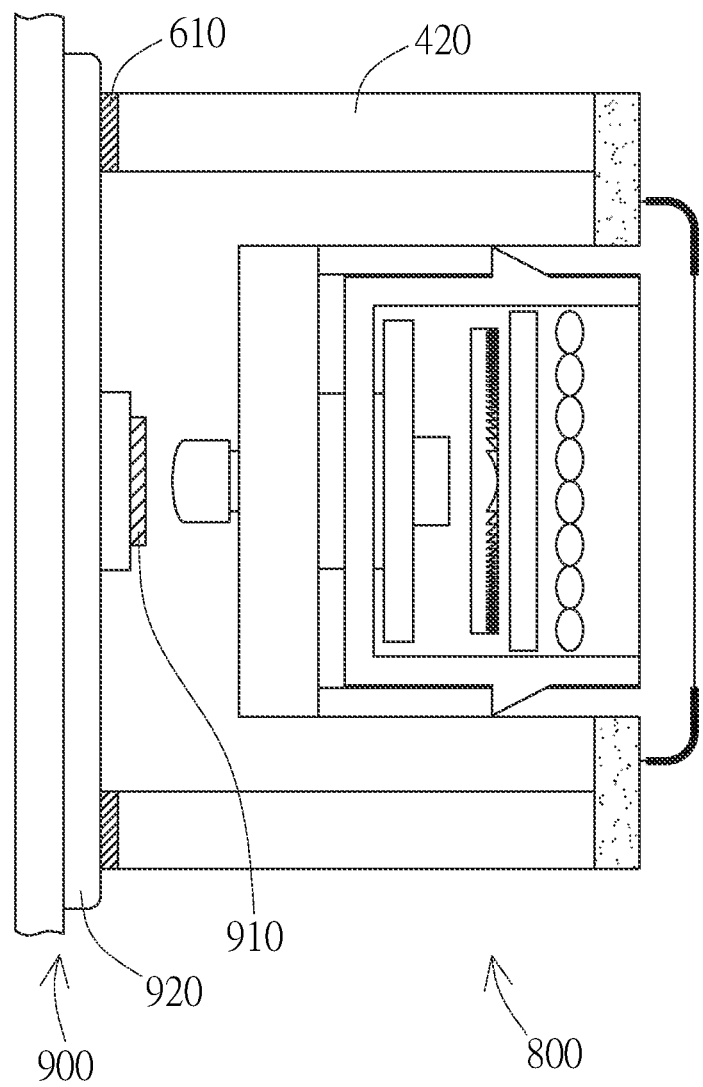
FIG. 5 is a schematic diagram of an embodiment in which a fixed member is adhered to a decorative board of a contact-type touch device by adhesive according to the present disclosure.
Figure 6A:
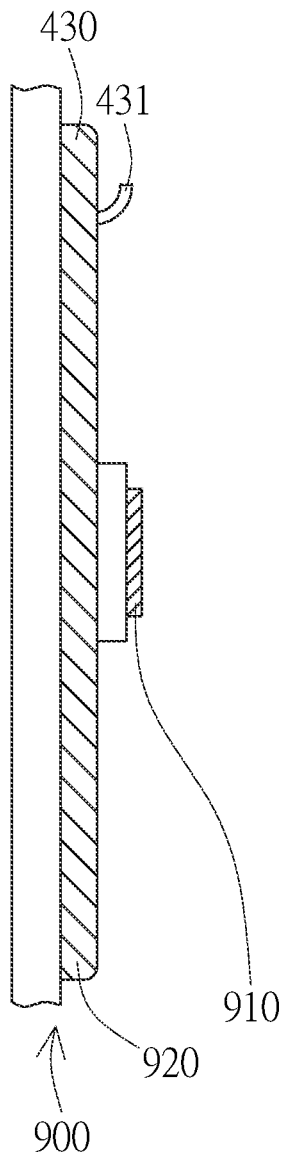
FIG. 6A to FIG. 7B are schematic diagrams of an embodiment of an auxiliary fixed member according to the present disclosure.
Figure 6B:
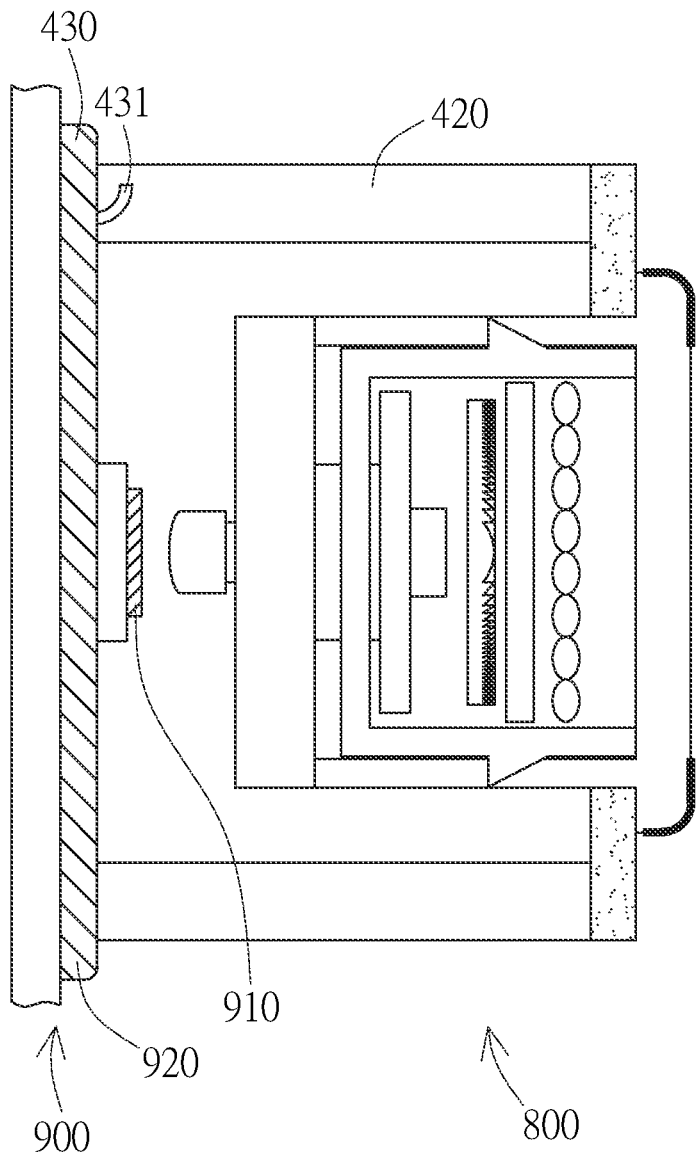
Figure 7A:
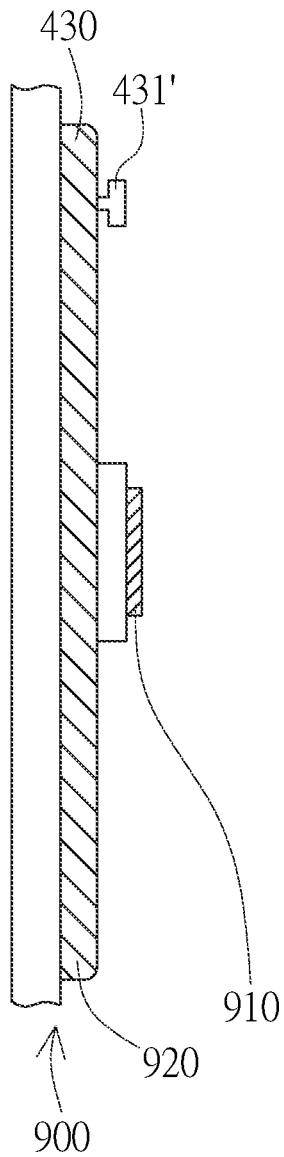
Figure 7B:
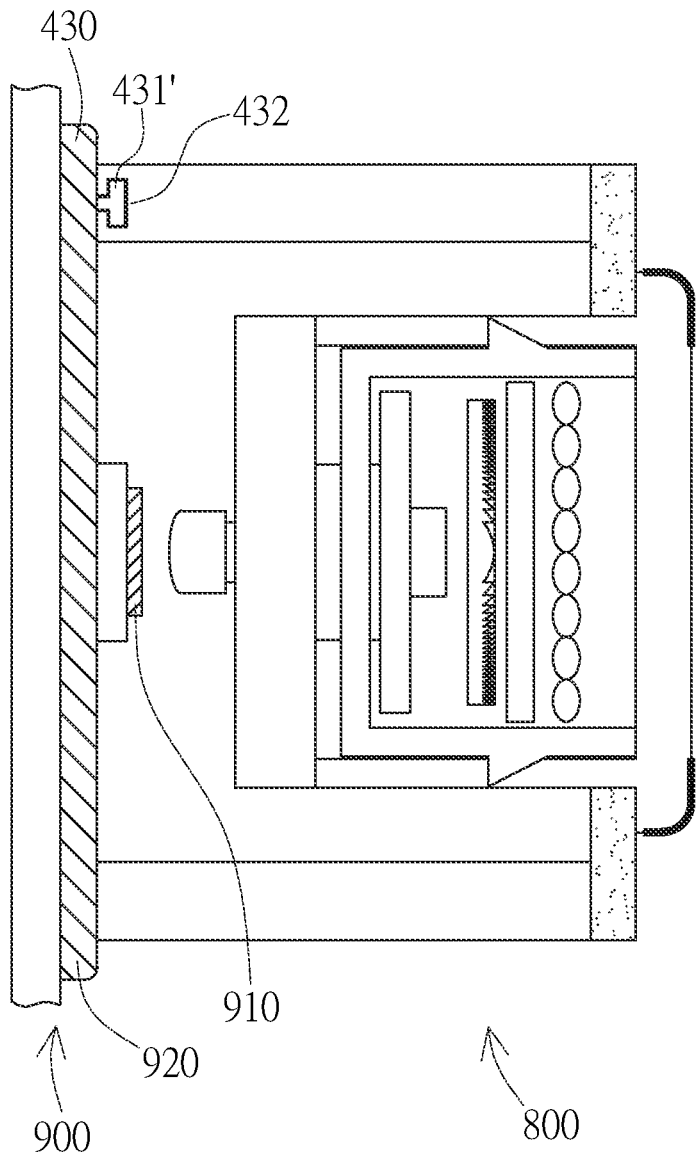

Based on the considerations such as manufacture, use, or design, the fixed member 420 may be fixed in front of the contact-type button 910 in a plurality of manners. In the embodiment shown in FIG. 5, the fixed member 420 may be adhered to a decorative board 920 of the contact-type touch device 900 by, for example, adhesive 610. However, in different embodiments, the decorative plate 920 may be replaced with another object to improve the fixing effect or facilitate disassembly and replacement. In the embodiments shown in FIG. 6A and FIG. 6B, the attached floating image touch-control device 800 further includes an auxiliary fixed member 430. The auxiliary fixed member 430 may be fixed beside the contact-type button 910, and the fixed member 420 is fixed to the auxiliary fixed member 430. Further, in this embodiment, the decorative plate 920 in the embodiment shown in FIG. 5 is replaced by the auxiliary fixed member 430 with a hook 431, and then the fixed member 420 is attached to the auxiliary fixed member 430 to achieve the fixing effect. In the embodiments shown in FIG. 7A and FIG. 7B, the decorative plate 920 in the embodiment shown in FIG. 5 is replaced by the auxiliary fixed member 430 with a tenon 431', and then an engagement groove 432 of the fixed member 420 is engaged with the tenon 431' to achieve the fixing effect.

Figure 8:
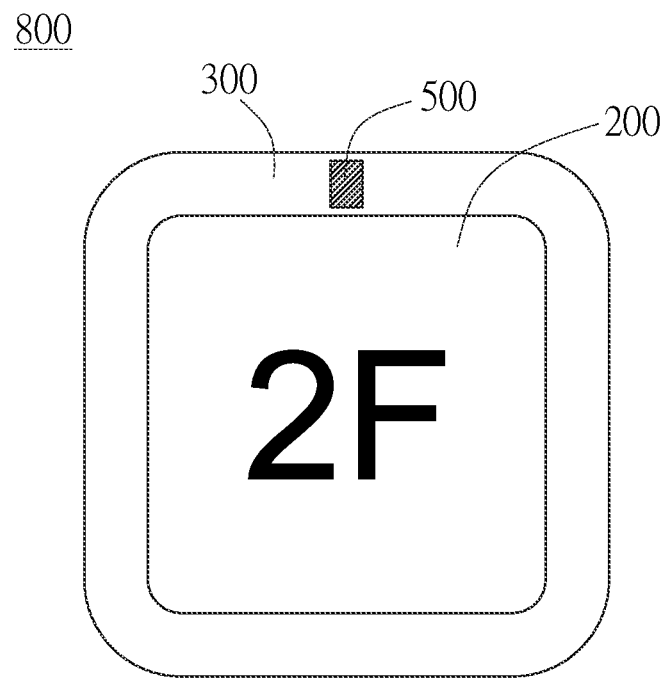
FIG. 8 is a schematic diagram of an embodiment of a status indication module according to the present disclosure.

For the contact-type button 910 with light ray changes before and after triggering to indicate the state, in an embodiment, the fixed device may transmit light to observe whether the touch action has successfully triggered the contact-type button 910. However, in different embodiments, the attached floating image touch-control device 800 may further include a status indication module 500 communicatively connected to the sensing module 300. The status indication module 500 generates a status indication signal based on the driving signal, which is more convenient to observe whether the touch action has successfully triggered the contact-type button 910. In the embodiment shown in FIG. 8, the status indication module 500 is a light-emitting device, and the status indication signal is light. However, in different embodiments, the status indication module may be a sound generation device, and the status indication signal is a sound.

The present disclosure has been described by the above related embodiments, but the above embodiments are merely examples for implementing the present disclosure. It should be pointed out that the disclosed embodiments do not limit the scope of the present disclosure. On the contrary, modifications and equal arrangements included in the spirit and scope of the patent application are all included in the scope of the present disclosure.

What is claimed is:

1. An attached floating image touch-control device, configured for use with a contact-type touch device, wherein the contact-type touch device comprises a contact-type button, and the attached floating image touch-control device comprises:

a trigger module, comprising a movable trigger component;

a floating image generation module, comprising:
  a light source;
  an imaging unit, arranged on the light source; and
  a floating image generation unit, arranged on the imaging unit; and
a sensing module, arranged on the floating image generation module and communicatively connected to the trigger module, wherein when the sensing module senses a touch action, the sensing module outputs a driving signal, and the trigger module moves the trigger component based on the driving signal to contact and trigger the contact-type button.

2. The attached floating image touch-control device according to claim 1, further comprising a fixed device, wherein the trigger module, the floating image generation module, and the sensing module are arranged in the fixed device, and the fixed device is fixed to a side of the contact-type button, so that the trigger module is located in front of the contact-type button.

3. The attached floating image touch-control device according to claim 2, wherein the fixed device comprises:
  a panel, comprising a module arrangement hole and a first side surface and a second side surface opposite to each other, wherein the trigger module, the floating image generation module, and the sensing module are arranged in the module arrangement hole, the sensing module is configured to sense the touch action performed on an outer side of the first side surface, the floating image generation module is configured to generate a floating image to be displayed on the outer side of the first side surface, and the trigger component of the trigger module is movable on an outer side of the second side surface; and
  a fixed member, arranged on the second side surface and surrounding a periphery of the panel, wherein the fixed member is configured to be fixed to the front of the contact-type button, so that a vertical projection of the contact-type button with respect to the panel overlaps the module arrangement hole.

4. The attached floating image touch-control device according to claim 3, further comprising an auxiliary fixed member, wherein the auxiliary fixed member is configured to be fixed beside the contact-type button, and the fixed member is fixed to the auxiliary fixed member.

5. The attached floating image touch-control device according to claim 2, wherein the fixed device is light-transmissive.

6. The attached floating image touch-control device according to claim 1, wherein vertical projections of the trigger module and the floating image generation module with respect to a plane substantially overlap.

7. The attached floating image touch-control device according to claim 1, wherein vertical projections of the trigger module and the floating image generation module with respect to a plane do not overlap.

8. The attached floating image touch-control device according to claim 1, further comprising a status indication module communicatively connected to the sensing module, wherein the status indication module generates a status indication signal based on the driving signal.

9. The attached floating image touch-control device according to claim 8, wherein the status indication module is a light-emitting device, and the status indication signal is light.

10. The attached floating image touch-control device according to claim 8, wherein the status indication module is a sound generation device, and the status indication signal is a sound.

* * * * *